(12) United States Patent  
Renz

(10) Patent No.: US 7,971,626 B2
(45) Date of Patent: Jul. 5, 2011

(54) PROTECTIVE DEVICE FOR A VEHICLE INTERIOR

(75) Inventor: Guenther Renz, Ditzingen (DE)

(73) Assignee: Bos GmbH & Co. KG, Ostfildern (DE)

( * ) Notice: Subject to any disclaimer, the term of this patent is extended or adjusted under 35 U.S.C. 154(b) by 214 days.

(21) Appl. No.: 12/284,693

(22) Filed: Sep. 24, 2008

(65) Prior Publication Data

US 2009/0084508 A1    Apr. 2, 2009

(30) Foreign Application Priority Data

Sep. 28, 2007   (DE) .................. 10 2007 047 758

(51) Int. Cl.
*B60J 7/00*    (2006.01)
(52) U.S. Cl. .................. 160/370.22; 160/23.1; 160/264
(58) Field of Classification Search .................. 160/264, 160/268.1, 273.1, 239, 370.22
See application file for complete search history.

(56) References Cited

U.S. PATENT DOCUMENTS

| 3,116,097 | A | * | 12/1963 | Novales | 312/297 |
| 4,825,921 | A | * | 5/1989 | Rigter | 160/23.1 |
| 5,947,544 | A | * | 9/1999 | Hubeshi | 296/97.4 |
| 6,179,373 | B1 | * | 1/2001 | Bohm et al. | 296/214 |
| 7,114,767 | B2 | * | 10/2006 | Grimm et al. | 296/214 |
| 7,823,955 | B2 | * | 11/2010 | Alacqua et al. | 296/97.4 |
| 2007/0182190 | A1 | | 8/2007 | Walter et al. | |
| 2008/0216971 | A1 | * | 9/2008 | Rockelmann et al. | 160/271 |
| 2008/0277077 | A1 | * | 11/2008 | Rockelmann et al. | 160/268.1 |
| 2009/0008048 | A1 | * | 1/2009 | Stark | 160/370.22 |

FOREIGN PATENT DOCUMENTS

| DE | 196 25 939 A1 | 1/1998 |
| DE | 10 2005 048207 B3 | 11/2006 |
| EP | 1 816 032 A | 8/2007 |
| WO | WO 2006/053520 A2 | 5/2006 |

OTHER PUBLICATIONS

German language Search Report dated Jan. 23, 2009 (6 pages).
Search Report of German Patent Office dated May 13, 2008 (3 pages).

* cited by examiner

*Primary Examiner* — Blair M. Johnson
(74) *Attorney, Agent, or Firm* — Flynn, Thiel, Boutell & Tanis, P.C.

(57) ABSTRACT

A protective device for a vehicle interior having a flexible sheetlike structure provided on opposite sides with side edge regions, a winding shaft rotatably mounted and on which the sheetlike structure is held such that it can be wound up and unwound, and dimensionally rigid pull-out profile fixedly connected to a front face end region of the sheetlike structure in the unwinding direction.
Each side edge region of the sheetlike structure cooperates with at least one deflecting guide means which, in a force-fitting and/or form-fitting manner, transmits to the side edge region a tensile force component which acts outward transversely with respect to the winding-up or unwinding direction of the sheetlike structure.

8 Claims, 4 Drawing Sheets

PROTECTIVE DEVICE FOR A VEHICLE INTERIOR

FIELD OF THE INVENTION

The invention relates to a protective device for a vehicle interior having a flexible sheetlike structure which is provided on opposite sides with side edge regions, and having a winding shaft which is rotatably mounted and on which the sheetlike structure is held such that it can be wound up and unwound, and having a dimensionally rigid pull-out profile which is fixedly connected to the sheetlike structure in a front face end region of the sheetlike structure in the unwinding direction.

BACKGROUND OF THE INVENTION

Protective devices of said type are to be understood, within the context of the invention, to mean both luggage space covers and also dividing devices between the luggage space and the passenger compartment. Protective devices of said type also include sunshade devices which are provided in the region of side, front or rear vehicle windows or at transparent roof regions of the vehicle interior space.

A generally known sunshade device for a side vehicle window or for a glass sliding roof has a winding shaft which is rotatably mounted on the vehicle and on which a flexible sheetlike structure in the form of a sunshade roller blind is held such that it can be wound up and unwound. A front face end region of the sheetlike structure in the unwinding direction is fixedly connected to a pull-out profile which is of dimensionally rigid design. In the rest or storage state, the sheetlike structure is wound on the winding shaft. In the unwound, functional state, the sheetlike structure is tensioned parallel to the glass window region which is to be covered.

SUMMARY OF THE INVENTION

It is an object of the invention to create a protective device of the type specified in the introduction which makes it possible for the sheetlike structure to be wound up on the winding shaft without folding.

Said object is achieved in that each side edge region of the sheetlike structure cooperates with at least one deflecting guide means which, in a force-fitting and/or form-fitting manner, transmits a tensile force component, which acts outward transversely with respect to the winding-up or unwinding direction of the sheetlike structure, to the side edge region. An essential concept of the present invention is that of obtaining transverse tautening of the sheetlike structure spatially directly in front of a corresponding winding-up process, so as to make it possible for the sheetlike structure to be wound up on the winding shaft in a tautened and smooth fashion. Taut, smooth and uniform winding-up ensures that a correct winding function is always obtained even in the event of frequent winding up and unwinding.

In one refinement of the invention, the at least one deflecting guide means is arranged adjacent to the winding shaft and in particular directly adjacent to a winding space which surrounds the winding shaft. The winding shaft is preferably rotatably mounted in a cassetted housing which is arranged so as to be fixed with respect to the vehicle and which encloses the winding space. The deflecting guide means are advantageously then arranged in the region of the cassette housing, and are preferably fastened to the latter.

In a further refinement of the invention, each side edge region of the sheetlike structure has a side edge reinforcement which—as viewed in cross section—is aligned obliquely with respect to a tension plane of the sheetlike structure. The inclined and accordingly angled or curved design of the side edge reinforcement, with respect to the plane of the sheetlike structure in which the sheetlike structure is aligned in the unwound tensioned state, permits a transverse engagement of force which leads to tautening of the sheetlike structure.

In a further refinement of the invention, the deflecting guide means are provided with rolling or sliding elements which engage on the respective side edge region and in particular on the oblique side edge region. The rolling or sliding elements can therefore, in a force-fitting and/or form-fitting manner, impart a transverse force to the flexible sheetlike structure shortly before the winding up of the sheetlike structure onto the winding shaft, thereby making it possible for the sheetlike structure to be wound up in a smooth and tautened fashion.

In a further embodiment of the invention, the deflecting means comprise support elements which serve as abutments for the rolling or sliding elements in order to provide guidance of the side edge regions between support elements and sliding or rolling elements. The function of the rolling or sliding elements is further improved in this way, since the corresponding side edge regions of the sheetlike structure are held between rolling or sliding elements and support elements.

In a further refinement of the invention, the rolling or sliding elements are resiliently mounted in a force-limiting fashion. Said force limitation ensures that no excessively high transverse forces are exerted on the sheetlike structure which lead to damage to the textile structure of the sheetlike structure. The sheetlike structure is preferably embodied as a cloth or as a fabric.

In a further refinement of the invention, the rolling elements are provided with rotational axes which are inclined with respect to the winding-up or unwinding direction of the sheetlike structure. The rotational axes of the rolling elements which cooperate with the opposite side edge regions of the sheetlike structure are positioned so as to be mirror-symmetrical with respect to a central longitudinal axis of the sheetlike structure, such that rolling of the rolling elements on a surface of the sheetlike structure inevitably leads to side edge regions being obliquely guided or deflected outward, resulting in a desired tensile force component being generated outward transversely with respect to the winding-up or unwinding direction of the sheetlike structure. This leads to transverse tautening of the entire fabric or cloth at the level of said rolling elements, which are preferably arranged directly adjacent to the winding shaft. During a winding-up process, the sheetlike structure is therefore tautened in the transverse direction in a spatial region situated directly in front of a corresponding winding space of the winding shaft.

Further advantages and features of the invention can be gathered from the claims and from the following description of preferred exemplary embodiments of the invention, which are illustrated on the basis of the drawings.

BRIEF DESCRIPTION OF THE DRAWINGS

FIG. 7b shows a schematic plan view of the deflecting guide means of FIG. 7a.

DETAILED DESCRIPTION

Figure 1:
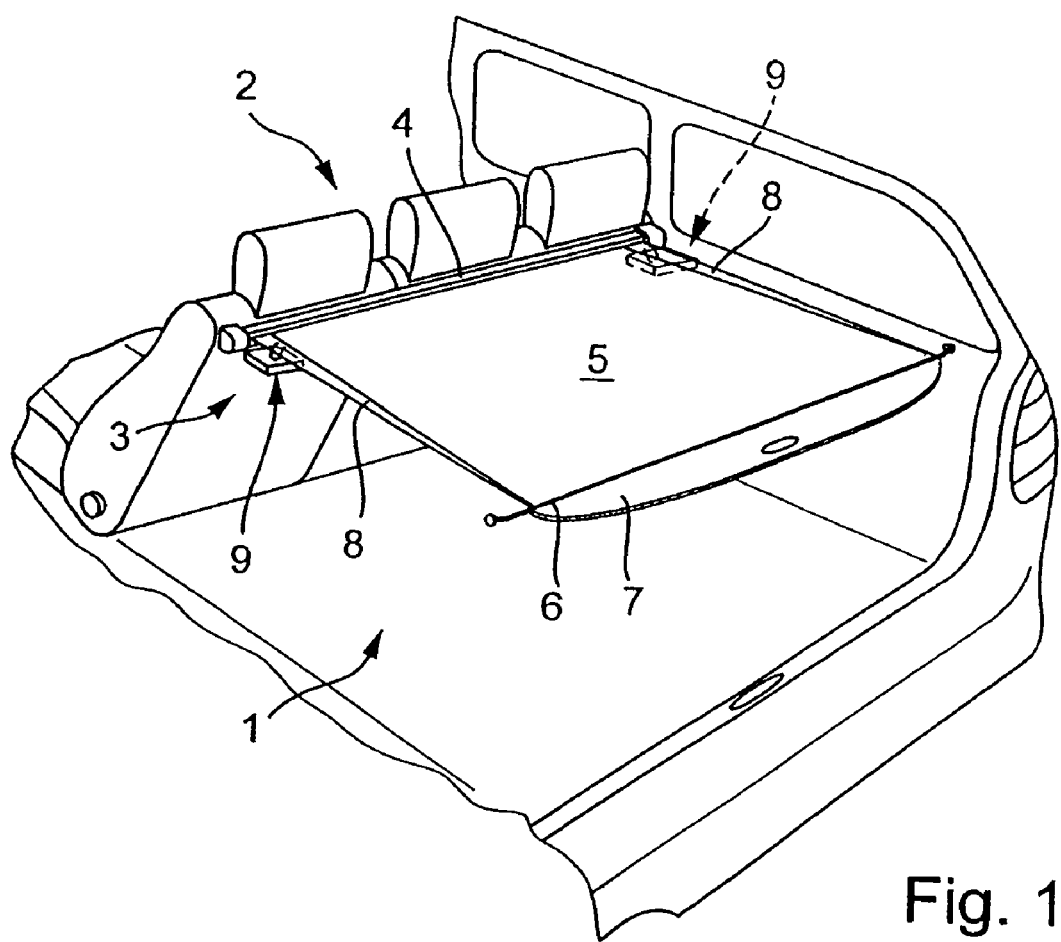
FIG. 1 schematically shows an embodiment of a protective device according to the invention, in a vehicle interior of a passenger vehicle, FIG. 2a schematically shows, in cross section, the function of a deflecting guide means in the protective device of FIG. 1.

A vehicle interior of a passenger vehicle as per FIG. 1 has, at the rear side, a luggage space 1 which is adjoined to the front in the vehicle longitudinal direction by a passenger compartment 2. The luggage space 1 is separated from the passenger compartment 2 by a backrest arrangement 3 of a rear seat bank. Arranged directly behind the backrest arrangement 3 is a protective device according to the invention which serves to approximately horizontally cover the luggage space 1. The protective device has a dimensionally rigid cassette housing 4 which is elongate in the vehicle transverse direction and which is arranged, so as to be fixed with respect to the vehicle, in the luggage space 1 a short distance below a vehicle sill. A winding shaft is rotatably mounted in the cassette housing 4, in a fundamentally known way. In the embodiment as per FIG. 3, the winding shaft is identified with the reference sign W.

A flexible, limp sheetlike structure 5 is held on the winding shaft such that it can be wound up and unwound. For this purpose, the sheetlike structure 5 is fastened with a front face end region in the winding-up direction to the winding shaft. At a front face end region in the unwinding direction, the sheetlike structure 5 is fixedly connected to a pull-out profile 6 which defines a dimensionally rigid contoured part 7. The pull-out profile can, at the rear side, be hooked in a fundamentally known manner into luggage-space-side holding receptacles, and accordingly fixed in a pulled-out, protective position. The winding shaft W is acted on with torque in the winding up direction by a spring motor (not shown), such that the sheetlike structure 5, after the pull-out profile 6 is detached from the vehicle-side holding receptacles, is inevitably and automatically wound up around the shaft W and accordingly pulled into the cassette housing 4. The cassette housing 4 has a holding space which surrounds the winding shaft W and which is selected to be sufficiently large that the sheetlike structure 5 can be completely wound up within the cassette housing 4. The sheetlike structure 5 emerges outward through the cassette housing 4 in a fundamentally known way via a longitudinal slot in the cassette housing 4, which slot runs over virtually the entire length of the cassette housing 4 and is slightly larger than a maximum width of the sheetlike structure 5.

The sheetlike structure 5 is provided with opposite side edge reinforcements 8 which, over the entire length of the sheetlike structure 5, as viewed in the pulling-out direction of the sheetlike structure 5, form the opposite side edge regions of the sheetlike structure 5.

Figure 2A:
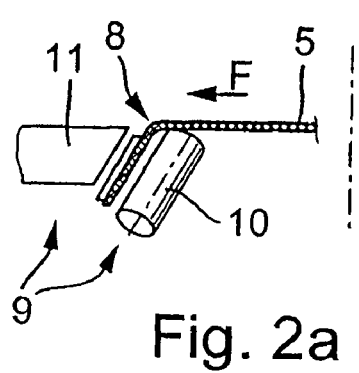
FIG. 2b shows, in plan view, and highly schematically, the function of the deflecting guide means of FIG. 2a, FIG. 3 shows a detail of a further embodiment of a protective device according to the invention, having deflecting guide means which are provided adjacent to a winding shaft for the sheetlike structure, FIG. 4 schematically shows, in a plan view, the function of a deflecting guide means similar to FIG. 3.
Figure 2B:
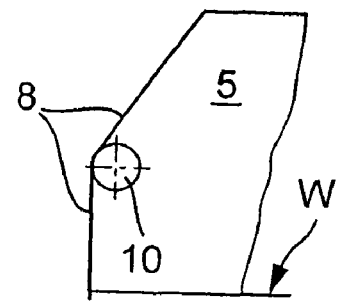

The side edge reinforcements 8 are angled side edge regions which, as can be seen from FIGS. 2a and 2b, are additionally provided with an edge strip which serves to reinforce the respective side edge region.

To ensure that the sheetlike structure 5 is wound up on the winding shaft W without folding and in a tautened fashion during a winding-up process, the sheetlike structure 5 cooperates with deflecting guide means 9 (FIGS. 1 and 2a, 2b) which apply tensile forces, in the transverse direction with respect to a pulling-out or retraction direction of the sheetlike structure 5, to the reinforced side edge regions of the sheetlike structure 5, that is to say to the side edge reinforcements 8. In an illustrated exemplary embodiment, with the pulling-out movement of the sheetlike structure 5 taking place in the vehicle longitudinal direction, said transverse direction accordingly corresponds to a vehicle transverse direction. The deflecting guide means 9 are arranged directly adjacent to the cassette housing 4 so as to be fixed with respect to the vehicle or fixed with respect to the luggage space. Here, the deflecting guide means 9 cooperate with the two opposite side edge reinforcements 8. Each deflecting guide means 9 has at least one rolling element 10 which serves for deflecting the respective side edge reinforcement 8. The arrangement of the rolling element 10 is selected such that the side edge reinforcement 8 and in particular the sheetlike structure 5 is loaded in tension in the transverse direction during a deflection over the at least one rolling element 10, as per the force arrow F (FIG. 2a). During a winding-up process, the sheetlike structure 5 is therefore tautened in the transverse direction directly in front of the longitudinal slot of the housing, in each case with its section which is running into said slot, with the opposite guide means 9 self-evidently imparting mutually opposing tensile forces. The transverse tautening function of the deflecting guide means 9 is schematically illustrated in exaggerated form in FIG. 2b. The reference sign W indicates the winding shaft which is mounted in the cassette housing 4 as per FIG. 1. It can be seen that the deflection over the deflecting guide rollers 10 leads to a movement of the side edge reinforcements 8 outward, and accordingly to transverse tautening of the sheetlike structure 5. The deflecting guide means 9 are otherwise arranged such that the side edge reinforcements 8 are subsequently wound up parallel to one another and therefore transversely with respect to a rotational axis of the winding shaft W. As a result of the side edge regions, that is to say the side edge reinforcements 8, being angled at an angle of less than 90° as viewed relative to the planar center region of the sheetlike structure 5, the side edge reinforcements 8 inevitably re-assume their planar alignment as they run onto the winding shaft W, such that the side edge reinforcements 8 can be wound up in layers one on top of the other.

At least one support element 11 is provided on the outer side, which is situated opposite at least one rolling element 10, of each side edge reinforcement 8. The support element 11 prevents the side edge reinforcement 8 from deflecting outward or from being able to slide off the rolling element 10. A guide gap is therefore generated between the support element 11 and the at least one rolling element 10, which guide gap provides the desired deflecting guidance for the side edge reinforcement 8.

Figure 3:
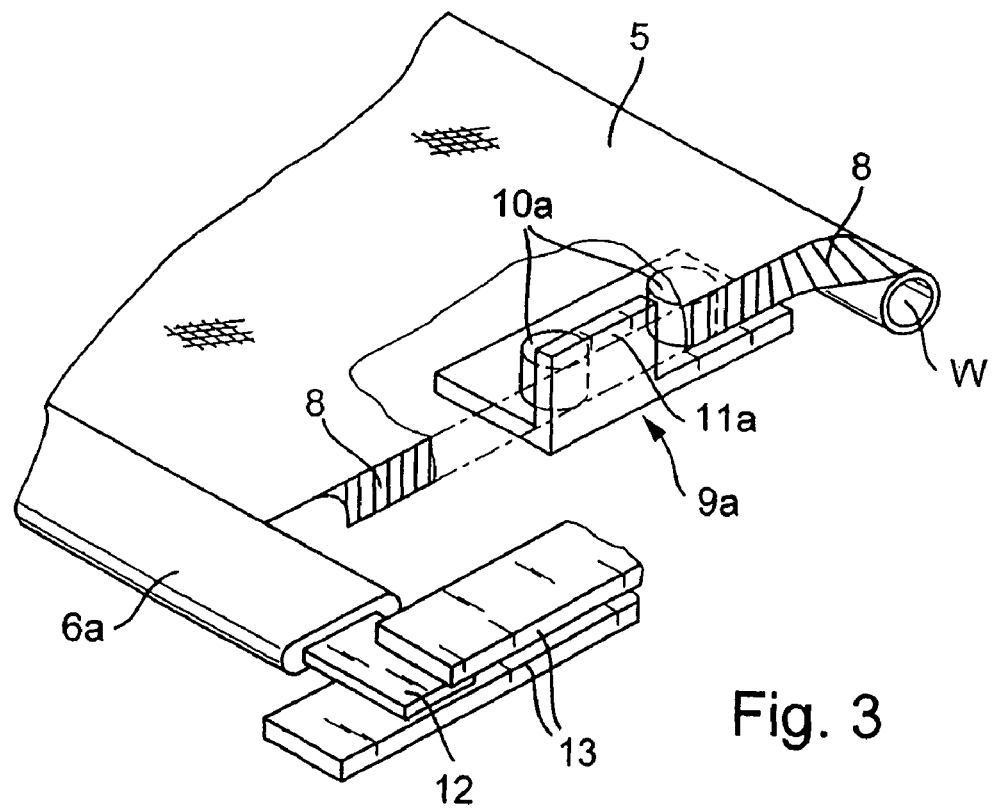

In the embodiment as per FIG. 3, a pull-out profile 6a of the sheetlike structure 5 is guided over its entire pull-out length in luggage-space-side longitudinal guide rails 13. The sheetlike structure 5 may be driven for a winding up or unwinding movement, wherein corresponding drive means may engage on the pull-out profile 6*a*. It is also possible for the sheetlike structure 5 to be moved manually. This does not affect the longitudinal guidance function of the longitudinal rails 13. Also, the sheetlike structure 5 which is provided with the pull-out profile 6*a* is provided, directly adjacent to the winding shaft W, with deflecting guide means 9*a* which are designed so as to perform an identical function to the deflecting guide means 9 as per FIGS. 1 to 2*b*. The only difference is that, in this embodiment as per FIG. 3, a corresponding, reinforced or non-reinforced, side edge region 8 of the sheetlike structure 5 is angled downward, approximately at right angles, in the region of the deflecting guide means 9*a*. The side edge region 8 preferably has a certain degree of inherent elasticity, such that it, after passing through the deflecting guide means 9*a*, automatically re-assumes a position which runs at least approximately flush with the rest of the sheetlike structure 5. This facilitates the planar and parallel winding-up of the side edge regions 8. The deflecting guide means 9*a* have two rolling elements 10*a* which are assigned a support strip 11*a*, which serves as a support element, as an abutment. The deflecting guide means 9*a*, too, are arranged so as to be fixed with respect to the vehicle or luggage space.

According to an advantageous embodiment of the invention, the deflecting guide means, for example 9 or 9*a*, are fastened to the cassette housing 4 and can be removed from the vehicle together with said cassette housing.

Figure 4:
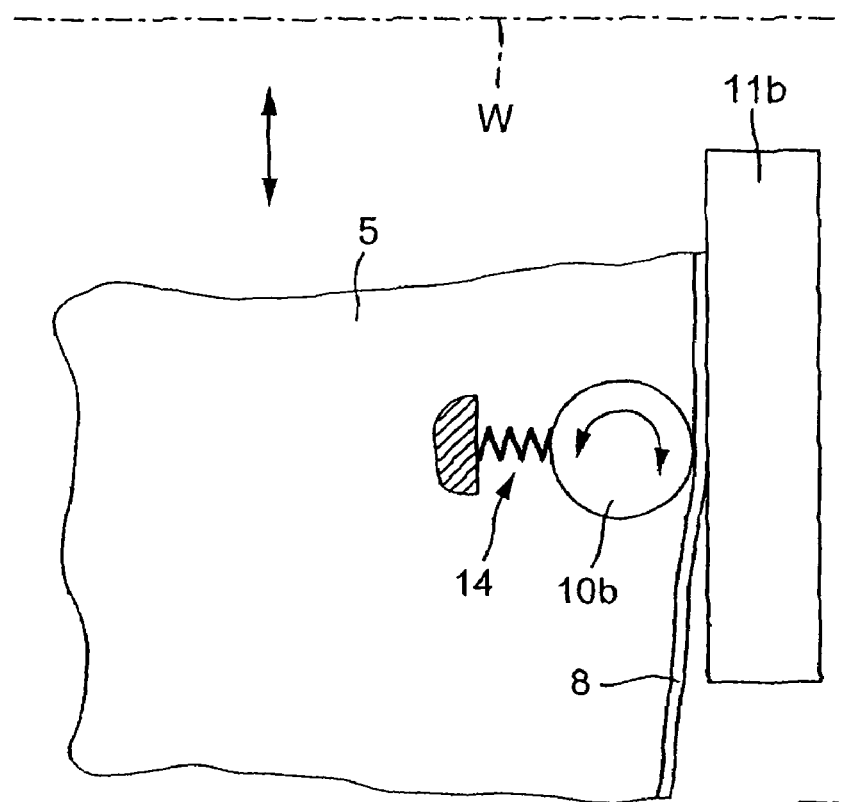
Figure 5A:
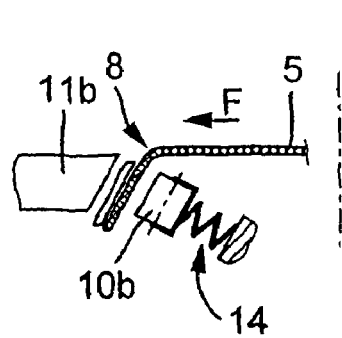
FIG. 5a shows, in a schematic cross-sectional illustration, a detail of a further embodiment of a protective device according to the invention in the region of a deflecting guide means similar to FIG. 2a, FIG. 5b shows, in plan view, the schematic function of the deflecting guide means of FIG. 5a, FIG. 6a shows a further embodiment of a deflecting guide means similar to FIG. 2a, in which the deflecting guide means engages around a side edge reinforcement, FIG. 6b schematically shows, in plan view, the function of the deflecting guide means of FIG. 6a, FIG. 7a shows a schematic front view of a further deflecting guide means for an embodiment of a protective device according to the invention.
Figure 5B:
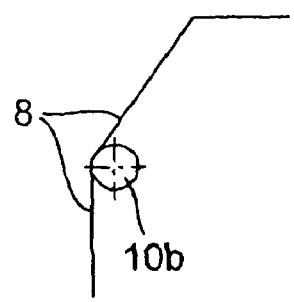

The basic function of the embodiment as per FIGS. 4 to 5*b* corresponds to the embodiments described above. Functionally equivalent parts or sections are provided with the same reference symbols, in some cases with the addition of the letter b. The significant difference is that, here, the rolling element 10*b* which serves as a pressure roller is additionally arranged so as to be movable in a resiliently elastic fashion in the transverse direction by means of a pressure spring arrangement 14. Said pressure spring arrangement 14 serves as a force limiter, since its spring force transversely with respect to the pulling-out direction of the sheetlike structure 5 is dimensioned such that the sheetlike structure 5 is not subjected to any excessively high transverse stresses which could lead to damage to the sheetlike structure 5. The reference symbol W again indicates a corresponding winding shaft. With regard to the further disclosure of this embodiment as per FIGS. 4 to 5*b*, reference is made, to avoid repetitions, to the above-described embodiments. The spring arrangement 14 is supported at one side on the rolling element 10*b*, which is arranged so as to be longitudinally movable transversely with respect to the pulling-out direction, that is to say in the vehicle transverse direction, and so as to be rotatable, and said spring arrangement 14 is supported at the other side so as to be fixed with respect to the luggage space.

Figure 6A:
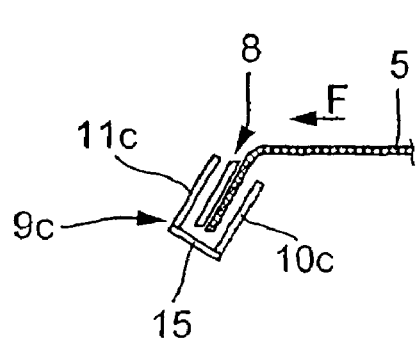
Figure 6B:
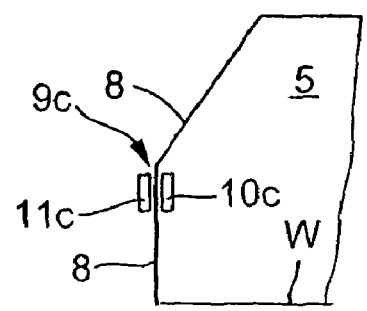

The embodiment as per FIGS. 6*a* and 6*b* also corresponds in terms of its basic function to the embodiment as per FIGS. 1 to 2*b*, such that reference is additionally made to the disclosure with regard to the embodiment of FIGS. 1 to 2*b*. The significant difference in this embodiment is that, for the inner deflection for the side edge reinforcement 8 of the sheetlike structure 5, a sliding element 10*c* is provided instead of a rolling element. Said sliding element 10*c* cooperates with, on the opposite outer side of the side edge reinforcement 8, a support element 11*c* whose function is identical to the function of the support element 11 as per FIG. 2*a*. The support element 11*c* and the sliding element 10*c* are additionally connected to one another by means of a transverse web 15 so as to form a U-shaped hollow profile, such that, for the side edge reinforcement 8, a guide groove which engages around the side edge reinforcement 8 is generated in the region of the deflecting guide means 9*c*.

The above-described embodiments bring about a deflection and guidance of the side edge regions of the sheetlike structure by means of a corresponding form-fitting action, by virtue of the rolling or sliding elements 10 to 10*c* deflecting the respective side edge reinforcement 8 in a form-fitting manner.

Figure 7A:
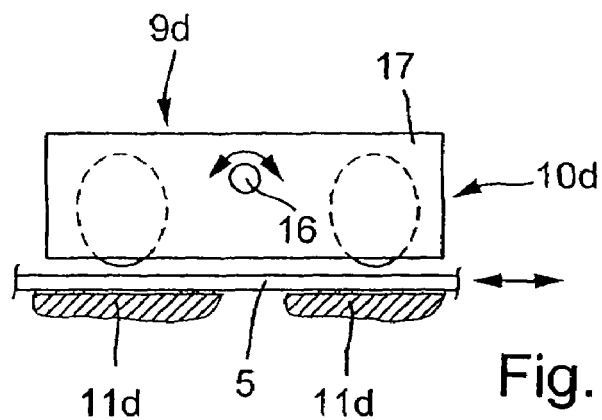
Figure 7B:
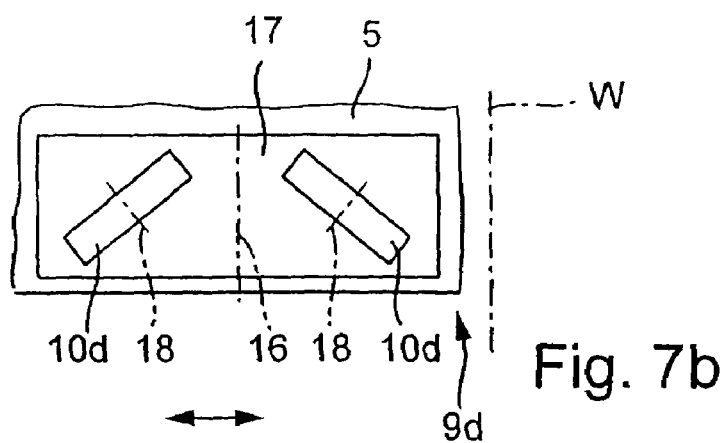

In the embodiment as per FIGS. 7*a* and 7*b*, transverse tensioning of the sheetlike structure 5 is obtained by means of deflecting guide means 9*d* which act purely in a force-fitting manner on the sheetlike structure 5 or on the side edge regions thereof. FIGS. 7*a* and 7*b* show a deflecting guide means 9*d* in which pressure rollers 10*d* press from above on the sheetlike structure 5 or on a corresponding side edge region. Provided opposite, in the region of an underside of the sheetlike structure 5 or of the side edge reinforcement, are support rests 11*d*. The essential feature of the deflecting guide means 9*d* is that in each case one pressure roller 10*d* is provided there, which pressure roller runs obliquely with respect to the pulling-out direction of the sheetlike structure 5. In the embodiment as per FIGS. 7*a* and 7*b*, each deflecting guide means 9*d* is provided with in each case one pressure roller 10*d* which is aligned obliquely outward relative to the winding-up direction, and having a further pressure roller 10*d* which is inclined obliquely outward relative to the unwinding direction. The two pressure rollers 10*d* are rotatably mounted in a common bearing block which is mounted so as to be tiltable, in the manner of a rocker, in the region of a joint pin 16. Depending on the direction in which the sheetlike structure 5 is moved, the one or the other pressure roller 10*d* comes into contact with the side edge region of the sheetlike structure 5. The contact, which occurs depending on the running direction of the sheetlike structure 5, of the one or of the other pressure roller, is controlled mechanically, electrically, pneumatically or hydraulically by control means (not illustrated).

During a winding-up process, the pressure roller 10*d* which is inclined obliquely outward in the winding-up direction is pressed on, such that a corresponding winding-up movement of the sheetlike structure 5 inevitably causes a tensile force component to be exerted on the sheetlike structure 5 in the outward direction transversely with respect to the winding-up direction. This generates the desired transverse tautening of the sheetlike structure 5. The deflecting guide means 9*d* is—as in the above-described exemplary embodiments—likewise arranged directly in front of a run-in region of the sheetlike structure 5 in the region of the winding shaft W. The winding-up and unwinding directions of the sheetlike structure 5 are indicated by the double arrows in FIGS. 7*a* and 7*b*. The winding shaft W is illustrated by the dash-dotted line W. Corresponding deflecting guide means 9*d* are of course assigned to the two opposite side edge regions of the sheetlike structure 5 in order to provide simultaneous and opposite, i.e. symmetrical, transverse tautening of the sheetlike structure 5.

The pressure rollers 10*d* are mounted in the bearing block 17 so as to be freely rotatably about rotational axes 18 which are inclined obliquely with respect to the winding-up and unwinding directions of the sheetlike structure 5.

The invention claimed is:
1. A protective device for a vehicle interior, comprising:
  a cassette housing removably mountable on the vehicle, and an elongate winding shaft rotatably mounted on the cassette housing;
  a flexible sheetlike structure having a rear end thereof held to the winding shaft such that the sheetlike structure can be wound around the shaft and unwound from the shaft, the sheetlike structure having a pull-out structure fixedly attached to a front end thereof;

the flexible sheetlike structure having flexible side edge regions provided adjacent opposite side edges thereof;

a pair of deflecting guide structures respectively positioned adjacent opposite ends of the winding shaft directly adjacent a winding space which surrounds said winding shaft, said deflecting guide structures being arranged solely in close proximity to the cassette housing and being fastened to said cassette housing so that removal of said cassette housing from the vehicle also effects removal of said deflecting guide structures;

each said deflecting guide structure engaging a respective side edge region in a force-fitting and/or form-fitting manner and applying a tensile force component to the respective side edge region which acts outward transversely with respect to the winding/unwinding direction of the sheetlike structure, whereby the pair of edge deflecting structures maintain the sheetlike structure in a taut condition transversely across the sheetlike structure at a location closely adjacent the winding shaft to facilitate winding of the sheetlike structure onto the shaft, wherein the side edges of the sheetlike structure, other than their engagement with the deflecting guide structures, are otherwise free of lateral guides when the sheetlike structure is unwound and is in an extended position.

2. A protective device according to claim 1, wherein each said side edge region comprises a side edge reinforcement which, viewed in cross section, projects angularly with respect to a tension plane of the sheetlike structure.

3. A protective device according to claim 1, wherein each deflecting guide structure is provided with a rolling or sliding element which engages and angularly deflects the respective side edge region relative to a tension plane of the sheetlike structure.

4. A protective device according to claim 3, wherein each deflecting guide structure includes a support element which opposes the rolling or sliding elements to provide guidance of the deflected side edge region therebetween.

5. A protective device according to claim 3, wherein the rolling or sliding element is resiliently mounted in a force-limiting fashion.

6. A protective device according to claim 3, wherein the rolling element is provided with a rotational axis which is inclined with respect to the winding-up or unwinding direction of the sheetlike structure.

7. A protective device according to claim 1, wherein each said deflecting guide structure includes a member which contacts the respective side edge region in close proximity to the respective side edge of the sheetlike structure and causes the side edge region to be angularly deflected relative to the center tensioned region of the sheetlike structure which extends transversely between the pair of deflecting guide structures.

8. A protective device according to claim 7, wherein the contact member associated with the deflecting guide structure comprises a rolling or sliding element.

* * * * *